March 7, 1933.  H. P. SMITH  1,900,470
AUTOMOTIVE SYSTEM
Filed Feb. 27, 1931  6 Sheets-Sheet 1

INVENTOR
Hubert P. Smith
By Green & McCallister
His Attorneys

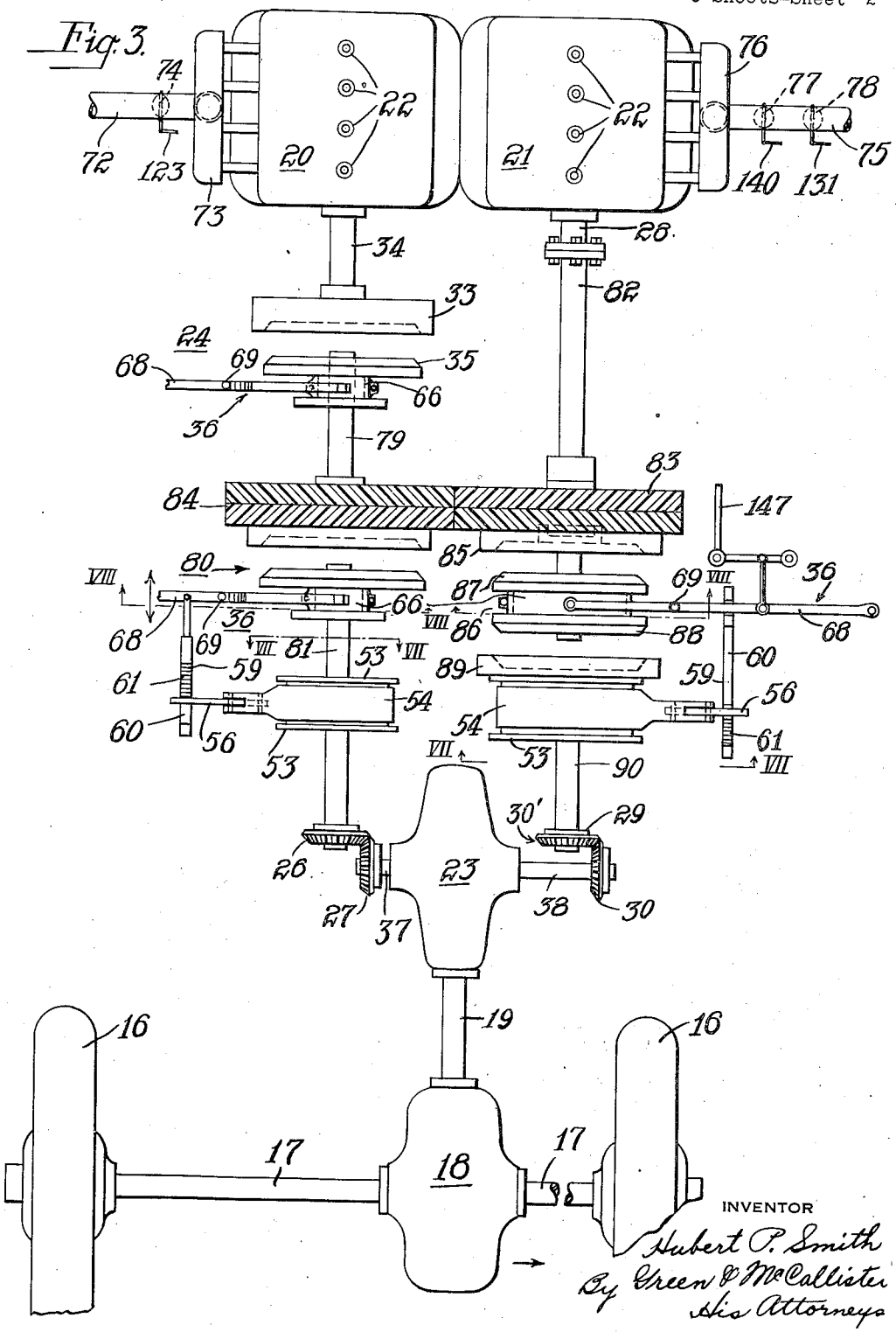

March 7, 1933.  H. P. SMITH  1,900,470
AUTOMOTIVE SYSTEM
Filed Feb. 27, 1931  6 Sheets-Sheet 3
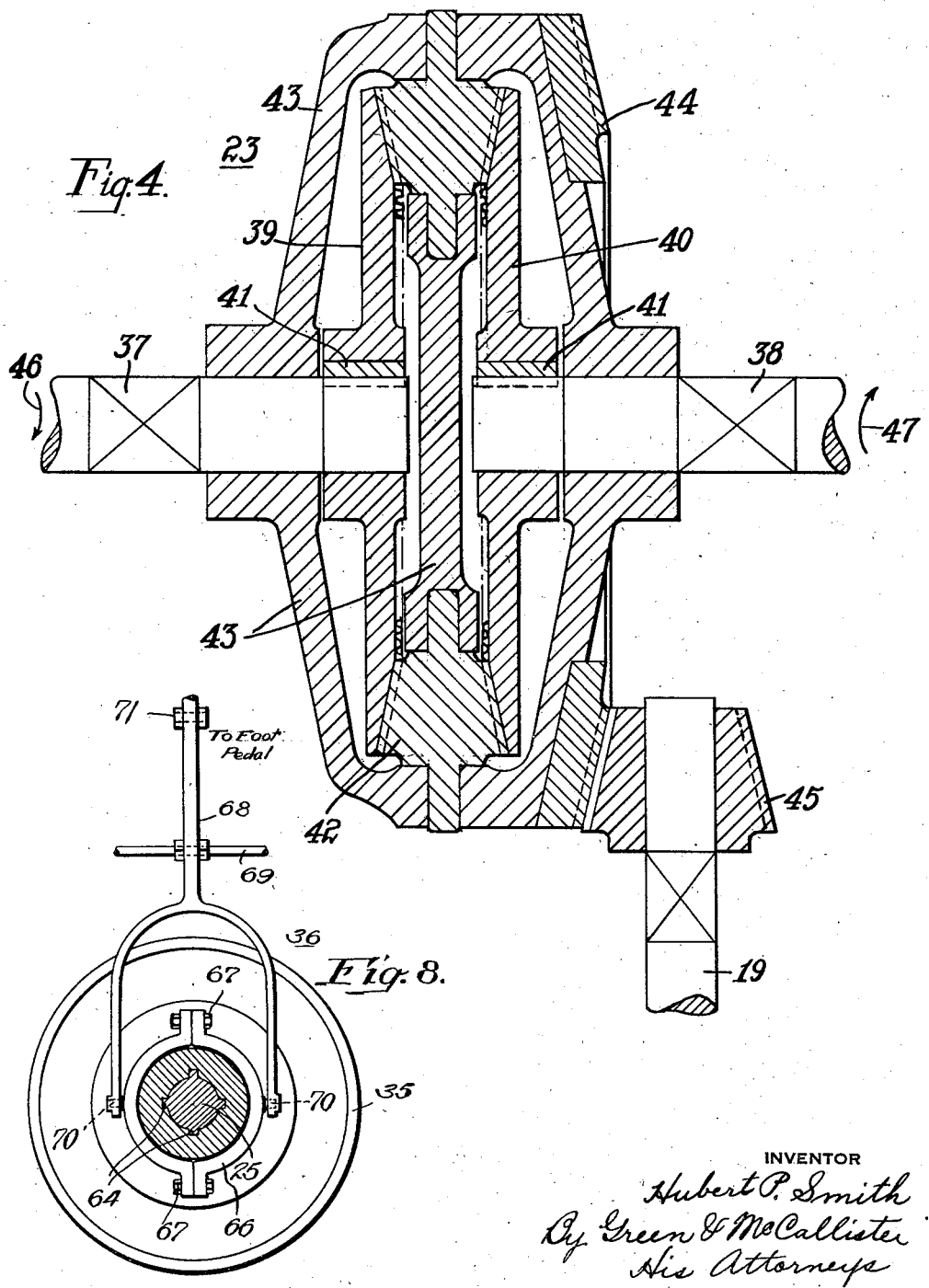

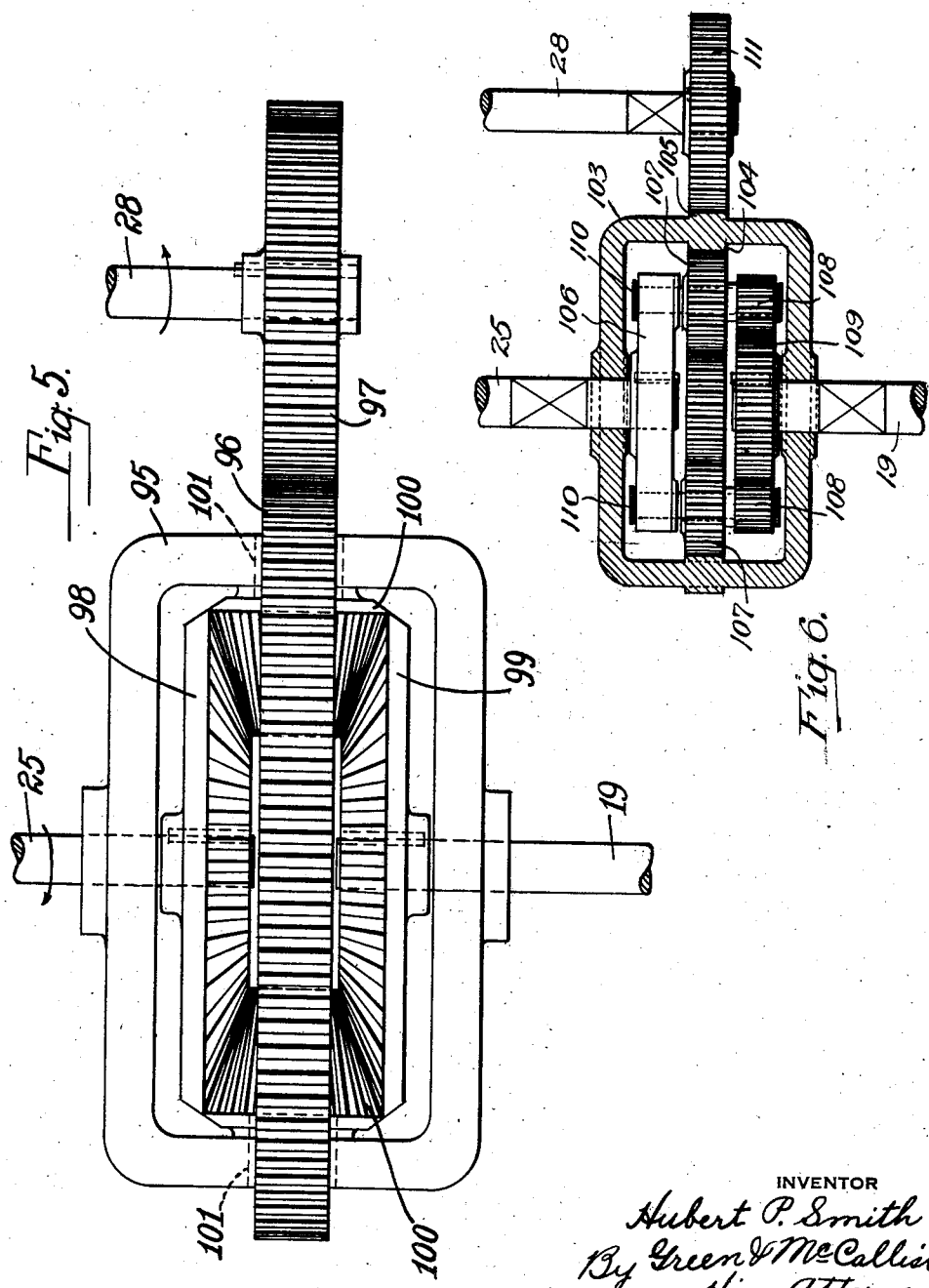

March 7, 1933.  H. P. SMITH  1,900,470
AUTOMOTIVE SYSTEM
Filed Feb. 27, 1931  6 Sheets-Sheet 5
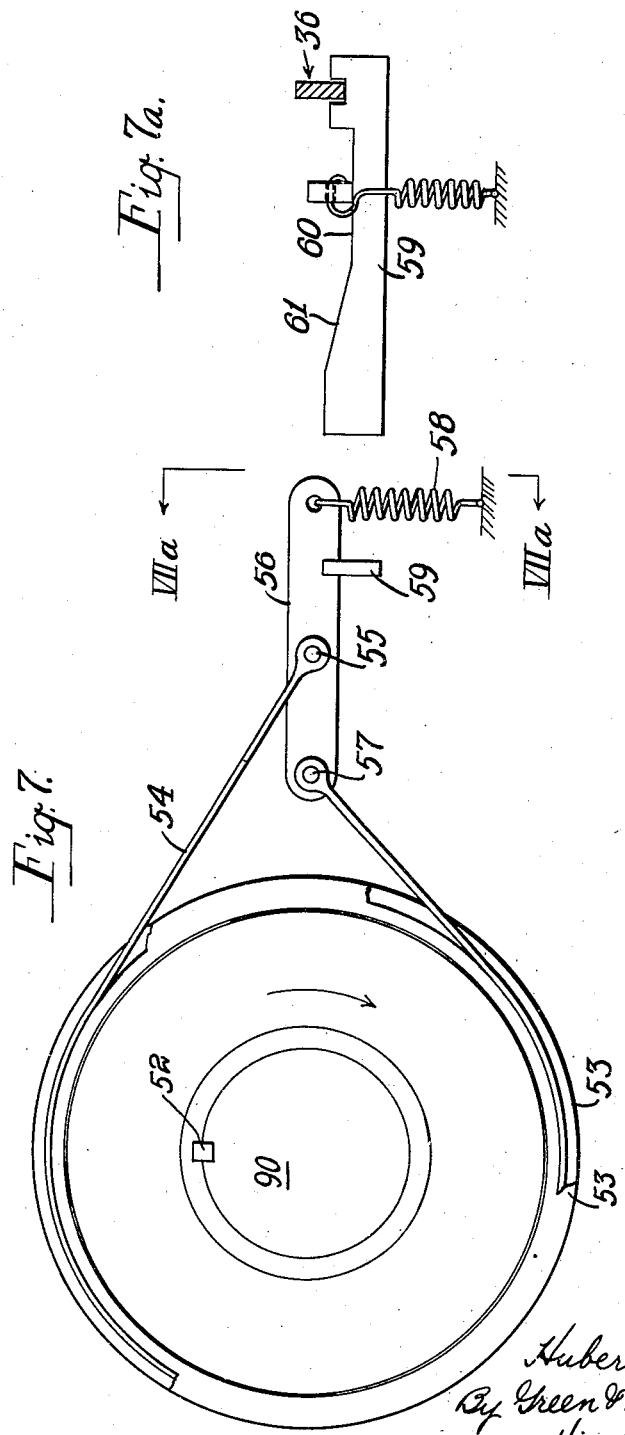
INVENTOR
Hubert P. Smith
By Green & McCallister
His Attorneys March 7, 1933.                H. P. SMITH                1,900,470
                           AUTOMOTIVE SYSTEM
                        Filed Feb. 27, 1931          6 Sheets-Sheet 6
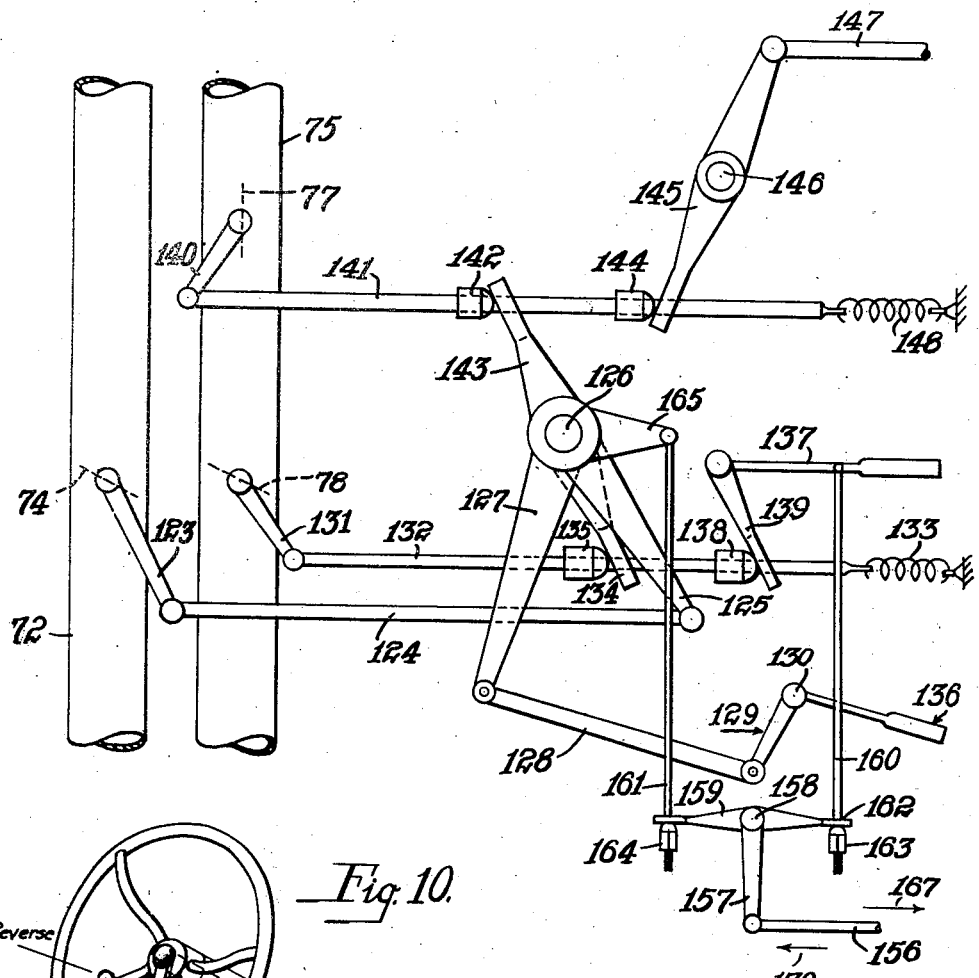
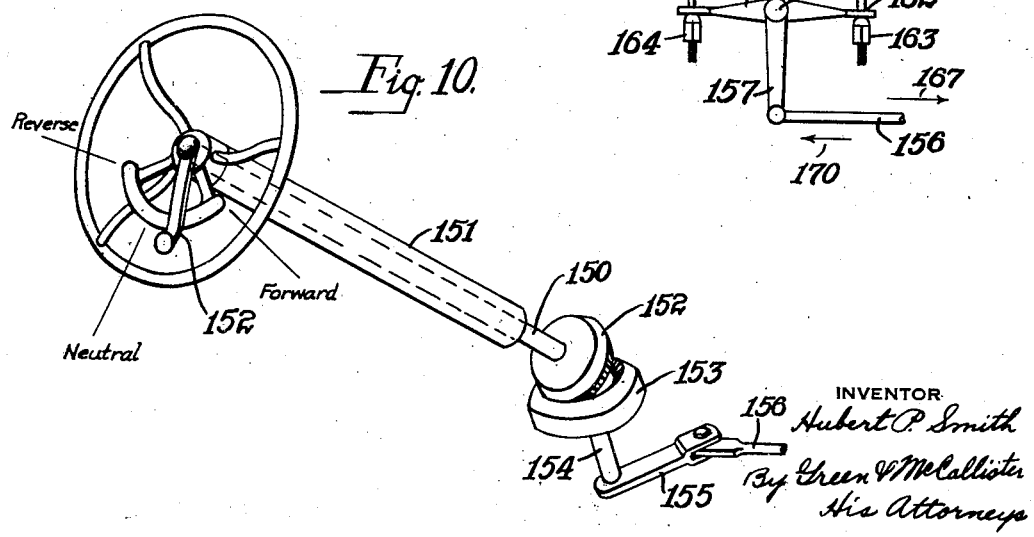
INVENTOR.
Hubert P. Smith
By Green & McCallister
His Attorneys Patented Mar. 7, 1933

1,900,470

UNITED STATES PATENT OFFICE

HUBERT P. SMITH, OF EMSWORTH, PENNSYLVANIA

AUTOMOTIVE SYSTEM

Application filed February 27, 1931. Serial No. 518,776.

This invention relates to an arrangement for delivering the power of a plurality of power units, arranged to operate simultaneously at different variable speeds, to a driven element, a torque delivery element, or the like. More specifically, the invention relates to power driven vehicles, (automobiles, railway vehicles, for example) in which the motive power is derived from a plurality of separate power units, (internal combustion engines, for example) and delivered to the traction wheels, without the use of or need for speed change gears, common to gear transmissions.

Heretofore, many attempts have been made to devise mechanisms whereby the torque, delivered to the traction wheels of a vehicle by an internal combustion engine, may be caused to automatically increase, as the load on the engine increases, and to automatically decease as the load on the engine decreases. Because of the inability to devise such mechanisms, gear transmissions have reached their present form of development and perfection, in order that the tractive effort delivered by the traction wheels of motor vehicles, may be varied as required for starting and running conditions.

An object of this invention is to utilize a plurality of independently operable power units as a source of motive power and to provide for the control of the torque delivered thereby for work or tractive purposes, without the use of transmission gears, disc and wheel clutches and the like.

Another object of the invention is to utilize a plurality of power units as a source of motive power and to provide for varying the torque delivered by said units in accordance with the difference in the operating speeds of the units.

A further object of the invention is to provide for differentially coupling a plurality of engines or power units to a driven element and varying the torque delivered by varying the difference in the operating speeds thereof, under certain conditions, and to provide for accumulatively coupling said engines to the driven element, under other conditions.

A still further object of the invention is to utilize a plurality of internal combustion engines for propelling a vehicle and to control the tractive effort developed and direction of movement of the vehicle by varying the relative speeds of said engines.

Other objects of the invention will, in part, be apparent and will, in part, be obvious from the following description and drawings.

The invention embodies the details of construction and the arrangement and combination of parts as will be more fully described and illustrated in the accompanying drawings in which:

Fig. 3 is a diagrammatic view illustrating a modified form of the invention as applied to a motor vehicle;

Fig. 4 is a plan view in section of a differential, embodied in the apparatus shown in Figs. 1 and 3 for connecting the motors or power units thereof to the torque, torsion or drive shaft of the vehicle;

Figs. 5 and 6 are modified forms of differentials that may be substituted for the differential shown in Fig. 4;

Fig. 7 is a view, looking in the direction of arrows VII—VII on Figs. 1 and 3, of a brake mechanism embodied in the arrangements shown in said figures;

Fig. 7a is a view looking in the direction of arrows VIIa—VIIa in Fig. 7;

Fig. 8 is a view, partly in section, taken on lines VIII—VIII of Figs. 1 and 3 of the clutch operating mechanism;

Figure 1:
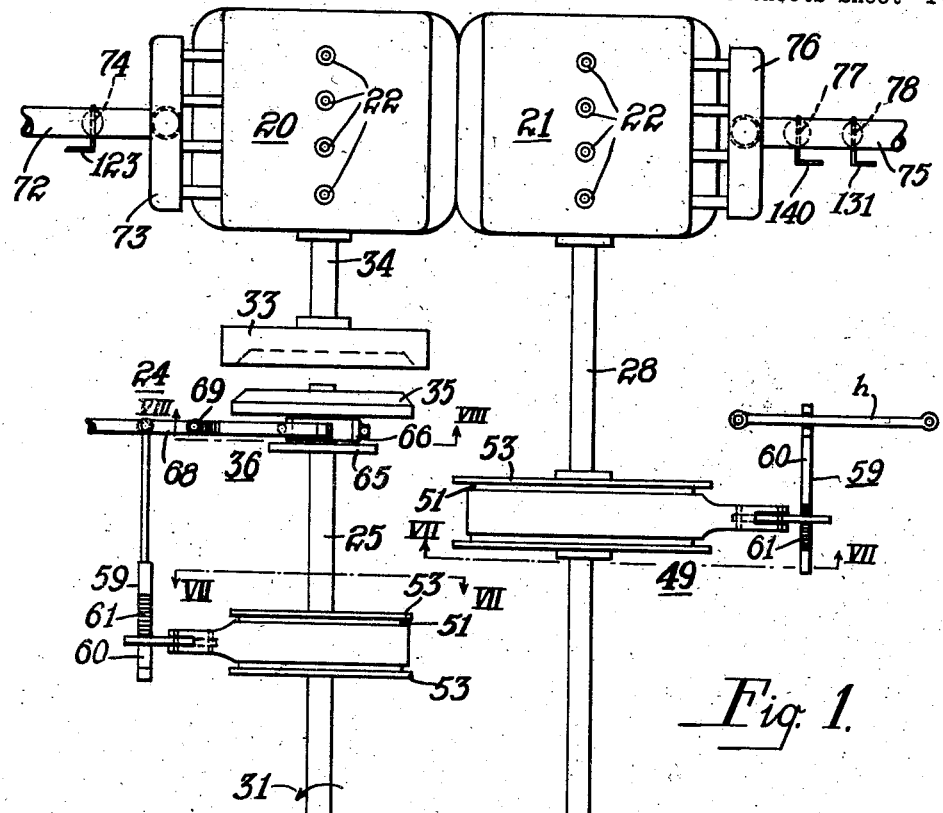
Figure 1 is a schematic illustration of apparatus embodying the invention as applied to a motor vehicle.
Figure 2:
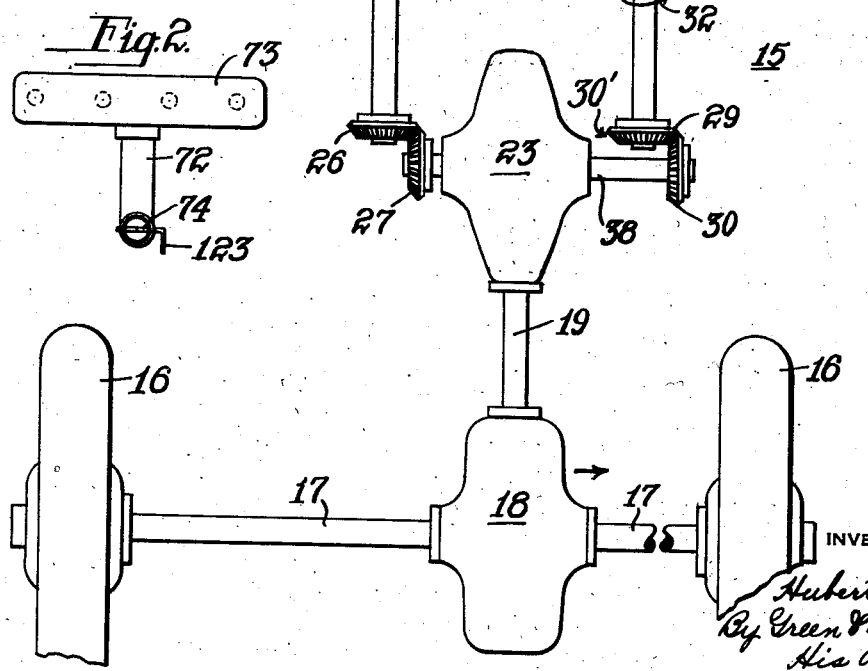
Fig. 2 is a front view in elevation of an intake manifold and fuel supply line embodied in the power units or motors of Fig. 1.

Fig. 9 is a diagrammatic view illustrating an arrangement of levers for operating the throttle valves of the engines or power units shown in Figs. 1 and 3; and Fig. 10 is a view in perspective illustrating a lever system operable from the steering wheel of a vehicle for operating certain of the levers shown in Fig. 9 thereby to control the relative speeds of the power units, the torque delivered to the traction wheels of the vehicle, and the speed and direction in which the vehicle is propelled.

Throughout the drawings and the specification like reference characters indicate like parts.

While the invention herein disclosed has many and varied applications, its adaptability to vehicles, such as automobiles, trucks, busses, railway cars and the like will be described. For purposes of illustration, an automotive vehicle is chosen in order that the invention and its manner of operation may be simply and clearly disclosed.

In Fig. 1 of the drawings a motor vehicle designated generally by the reference character 15 is illustrated schematically. The usual front wheels have been omitted from the illustration in order not to crowd the drawing and thereby obscure the invention.

Vehicle 15 includes traction wheels 16 mounted on axles 17 mechanically connected by a differential 18. The differential is common to practically all motor cars; hence the details of construction thereof have been omitted, a general indication thereof being sufficient for those skilled in this particular art.

In accordance with standard practice, the differential gears (not shown) connected to the axles 17 are driven by a shaft 19. Shaft 19 is often referred to as a torsion shaft or a drive shaft, but in its broader aspects it may be referred to as a torque delivery element.

In order that tractive effort may be delivered to wheels 16, thereby to propel the vehicle, a plurality of separate independently operable power units may be provided. For simplicity two power units 20 and 21 are shown. In practice the power units may take the form of any well known type of internal combustion engine.

The particular engines illustrated are of the four-cylinder type, four spark plugs 22 being indicated so that it may be apparent by inspection, the general type of internal combustion engine that may be employed. While a four-cylinder type engine has been mentioned and indicated in Fig. 1, it is to be understood that each engine may include any number of cylinders.

In practice engine 20 may have considerably more horsepower capacity than engine 21, so that a high powered engine may be employed to propel the vehicle when heavily loaded, and so that a lower powered or smaller engine may be utilized to propel the vehicle under light loads, or under heavy loads where the roadbed is relatively flat or level.

It is quite generally known that the internal combustion engines employed for propelling motor vehicles are larger than necessary except for unusual occasions, and that for the most part the engines operate under light loads. When so operating such engines are relatively inefficient. Internal combustion engines ordinarily operate at maximum efficiency when so loaded that they must develop approximately their maximum horsepower.

Since relatively high starting torques are required to start a motor vehicle from rest, the usual type of motor vehicle has a gear transmission, whereby a high gear reduction may be obtained between the engine and the traction wheels for starting purposes. In such case, the vehicle moves at a slow speed but the tractive effort delivered to the wheels is high. In the usual vehicle, after it is set in motion, the internal combustion engine is connected directly to the torsion shaft. When so connected, the vehicle moves at a much higher speed but the tractive effort delivered to the wheels is much lower than when the vehicle is starting from rest.

In the present case, the power units or engines 20 and 21 are so connected to the torsion shaft 19 that by varying the relative speeds of the engines the torque developed by or transmitted through shaft 19 to the tracive wheels 16 may be varied from a maximum, of a very high value, to a minimum or low value. The minimum or low value would be fixed by the minimum torque which could be developed by one or the other of the engines operating alone without stalling.

The manner in which the engines are connected to the torsion shaft 19 is such that by operating one of the engines at a higher speed than the other, the vehicle may be propelled in the forward direction, or in the reverse direction by operating the other engine at a higher speed than the former.

In order that the power units or engines 20 and 21 may be utilized to propel the vehicle without the use of transmission gears, the engines may be differentially coupled to torsion shaft 19 by a differential 23. Engine 20 may be connected to one side of the differential 23 by means of a clutch 24, a shaft 25 and bevel gears 26 and 27. Engine 21 may be connected to the other side of differential 23 by means of a shaft 28 and bevel gears 29 and 30.

As shown in Fig. 1 the crank shafts of engines 20 and 21 turn in such a direction that shafts 25 and 28 turn in opposite directions as indicated by arrows 31 and 32, respectively.

The engines may also be arranged to have the crank shafts turn in the same direction. In such a case, bevel gear 30 would be moved in towards the differential and mesh with gear 29 on the side indicated at 30'.

Clutch 24 may be of any standard form or construction. For simplicity a simple cone type of clutch has been illustrated. As shown, the clutch comprises a drive element 33 fixedly mounted to crank shaft 34 of engine 20 and a slidable element 35 slidably mounted on and splined to shaft 25. Element 35 of the clutch may be moved into engagement with element 33 or out of engagement therewith as shown in Fig. 1 by means of a clutch shifting device 36. Clutch shifting device 36 is illustrated in detail in Fig. 8 of the drawings.

Differential 23 is illustrated in detail in Fig. 4 of the drawings. However, other forms of differential may be utilized to differentially connect motors 20 and 21 to the torque or torsion shaft 19. Several forms of differential are illustrated in Figs. 5 and 6, inclusive.

Before going into the manner of operating the vehicle propelled by motors 20 and 21, as illustrated in Fig. 1, the details of construction of differential 23, as illustrated in Fig. 4 and the clutch shifting device 36, as illustrated in Fig. 8, will be described in detail.

As illustrated in Fig. 4, the differential 23 comprises differential shafts 37 and 38 to the adjacent ends of which bevel gears 39 and 40 are secured by keys 41. Bevel gears 39 and 40 mesh with pinions 42 which are rotatably mounted in a differential cage 43. Differential cage 43 carries a ring gear 44 that meshes with a pinion 45 secured to torsion shaft 19. Shaft 37 carries the bevel gear 27 and shaft 38 carries the bevel gear 30.

As will be apparent from Fig. 1, the relative positions of bevel gears 26 and 27, and 29 and 30 are such that when shafts 25 and 28 are rotating or turning in the directions indicated by arrows 31 and 32, differential shafts 37 and 38 will turn in opposite directions as indicated by arrows 46 and 47. Therefore, gears 39 and 40 of differential 23 will turn in opposite directions.

Because of the novel use to which differential 23 has been put, the differential may be referred to as a device having at least two drive gears differentially coupled to a driven element, or a torque delivery element. Also the arrangement may be referred to as comprising at least two drive shafts differentially coupled to a driven shaft. In the first case, the drive gears include bevel gears 39 and 40 differentially coupled to a driven element, comprising cage 43, ring gear 44, pinion 45 and torsion shaft 19; the differential coupling means including the pinions 42. In the second case, the drive shafts include shafts 37 and 38 differentially coupled by differential 23 to driven shaft 19; shaft 19 may also be considered as a torque delivery element since it is under a torsional stress while transmitting power to differential 18.

Since gears 39 and 40 have the same number of teeth it will be apparent that when these gears are rotating in opposite directions, at the same speed, the differential cage 43 will not turn. Therefore, torsion shaft 19 will not turn. Therefore, it follows that if vehicle 15 is to stand still or at rest, while the engines are running, the speed of engines 20 and 21 must be so adjusted that gears 39 and 40 will rotate or turn in opposite directions at the same speed.

If the speed of engine 20 is increased to a value above that at which engine 21 is operating, it will be apparent that gear 39 of differential 23 will turn faster than gear 40. Therefore, differential cage 43 will turn in the same direction as gear 39 but at a speed which is a function of the difference in the speeds of rotation of gears 39 and 40. Hence it may be said that the differential cage 43 will turn at a speed which is a function of the difference in the speeds of operation of motors 20 and 21.

Where a high starting torque is required to start the vehicle in the forward direction, the speed of engine 21 may be reduced to a value slightly below that of engine 20 so as to obtain a slight difference in rotating speeds between gears 39 and 40 of differential 23. When this difference in speeds has been obtained, the differential cage 43 will turn slowly in the direction in which gear 39 is turning thereby turning the torsion shaft 19 slowly or at a speed which is determined by the ratio of the number of teeth in ring gear 44 to the number of teeth in bevel gear 45.

When the operating speeds of engines 20 and 21 have been so adjusted, the speeds of both engines may be gradually increased so as to maintain the difference in speeds substantially constant. Therefore, as the speeds of operation of the two engines are increased simultaneously, the torque delivered to shaft 19 will be gradually increased to a very high value. After the vehicle has been set in motion, its speed may be accelerated by gradually decreasing the speed of engine 21 while engine 20 operates at a high speed; or the vehicle may be accelerated by increasing the speed of motor 20 and simultaneously decreasing the speed of motor 21. When the vehicle has been accelerated to a speed at which motor 20 is capable of propelling it without overloading, engine 21 may be stopped. In this case engine 20 will be operating directly through the differential 23, and gear cage 43 will be rotating at the same speed as gear 39.

When engine 21 has been stopped, provision must be made to prevent engine 20 from driving engine 21 through differential 23. In order to prevent engine 21 from being driven by engine 20, a brake mechanism 49 is provided. This mechanism is illustrated in Fig. 7.

One end of the brake band is secured to a pin 55 that extends through a lever 56, medially of its ends, while the other end of the band is secured to a fixed pivot 57 that serves also as the pivot for lever 56.

In the arrangement shown in Fig. 7, lever 56 is normally urged, by a spring 58, towards that position in which the brake is set or applied.

To provide for positively releasing the brake, when the manner in which the vehicle is operated, so requires, a cam member 59 is provided. Cam member 59 has a flat surface 60 and an upwardly inclined cam surface 61. When member 59 is moved to the left, as viewed from Fig. 7a, lever 56 rests upon flat surface 60, in which position, spring 58 pulls lever 56 downwardly whereby the brake band is tightened to set the brake.

If member 59 is moved to the right as viewed from Fig. 7a, cam surface 61 raises lever 56, against the opposing force of spring 58, whereby the brake band is loosened and the brake released.

As shown in Figs. 1, 3, 7 and 7a, cam member 59 is moved to brake-setting and brake-releasing position by the fork member of the clutch operating mechanism 36 associated with the respective clutches, except in the case of the brake mounted on shaft 28. The brake on shaft 28 is arranged to be operated by a lever h.

When the brakes 49 are mounted on shafts having clutches thereon (see Figs. 1 and 3), the operating mechanisms are so arranged that the brakes are set when the clutches are in disengaged positions. However, the brake on shaft 28 will be set when engine 21 is not operating, or when the engine is operating but a braking action is required to reduce the speed of the motor.

Clutch operating mechanism 36 is illustrated more in detail in Fig. 8 of the drawings. As there illustrated, clutch element 35 has a splined connection with shaft 25, as indicated at 64, and is slidable along the shaft. Clutch element 35 has a flange 65 (see Fig. 1) spaced from the back face of the clutch element. Between flange 65 and the back face of the clutch element is placed a collar 66 made in two parts held together by bolts 67. The collar is loosely mounted on the clutch element so that the clutch element may rotate without turning the collar.

In order that the clutch may be moved to release and clutching positions, respectively, a fork 68 is provided which is pivotally mounted on a pin or stub shaft 69. The prongs of the forks straddle the collar 66. The ends of the prongs of the fork may be apertured to receive lugs 70 which are free to turn in the apertures formed in the prongs. By turning the fork 68 on its stub shaft, clutch element 35 is moved back and forth on shaft 25. The upper end of fork 68 may be connected at 71 to a foot pedal common to motor vehicles, so that the operator by actuating the pedal may either move the clutch element into engagement or out of engagement as required.

The fuel necessary to operate motor 20 may be taken from a carbureter (not shown) that delivers fuel in atomized form through a pipe or fuel line 72 to a manifold 73 that distributes the fuel mixture to the cylinders of the engine. To control the amount of fuel supplied to the engine, and hence its power and speed of operation, a valve of any form such as a butterfly valve 74 is provided in the fuel line 72. By opening or closing valve 74 the power and speed of motor 20 may be controlled.

The fuel supplied to motor 21 is also taken from a carbureter (not shown) that discharges an atomized combustible mixture into a fuel line 75. Fuel line 75 discharges the mixture passing therethrough into a manifold 76 that serves the cylinders of the motor. As shown in Fig. 1, two butterfly valves 77 and 78 are provided in fuel line 75. Valves 77 and 78 are utilized when both engines are operating.

When motors 20 and 21 are operating differentially, valves 74 and 78 are operated in unison, in one direction, while valve 77 is actuated in the opposite direction; that is, as valves 74 and 78 are opened, valve 77 is closed and vice versa. Therefore, as one engine speeds up, the other slows down. The mechanism for operating valves 74, 77 and 78 is illustrated in Fig. 9 of the drawings and will be described in detail hereinafter.

To operate the vehicle 15 shown in Fig. 1, clutch 24 is moved to the position shown, in which position the engine 20 is disconnected from shaft 25. Motors 20 and 21 are started by cranking in the usual manner. After the engines have started, their speeds of operation are adjusted until they are operating at substantially the same speed, preferably at idling speed. Clutch element 35 is then gradually or gently moved into engagement with clutch element 33. When clutch 24 has been moved into clutching position, both engines may be speeded up simultaneously to a value that will be conducive to easy starting of the vehicle. To start and accelerate the vehicle, the speed of motor 21 is gradually reduced. As the speed of motor 21 becomes gradually less than that of motor 20 torque shaft 19 will turn and the speed at which it turns will be a function of the difference in the speeds at which the motors are operating.

If a high starting torque is necessary to move the vehicle, motor 20 may be speeded up as motor 21 is slowed down. Whether or not the speed of motor 20 is increased or permitted to remain substantially constant while the speed of motor 21 is being reduced will depend upon starting conditions, the rate of acceleration desired, the road bed, etc. In any case the motors will be controlled in accordance with the judgment of the operator.

When the vehicle has been accelerated to such a speed that motor 20 is capable of propelling the vehicle, engine 21 may be stopped by turning off the ignition. When the engine is stopped and the ignition turned off, brake 49 is set to prevent motor 20 from driving motor 21. The vehicle may now be driven at speeds corresponding to those speeds which are obtainable in the present automobile or truck when operating in high gear.

If the vehicle is traveling up relatively steep grades both motors may be operated. In such case motor 20 should be running at approximately its maximum horsepower capacity. If, on account of the steepness of the grade or bad road conditions, motor 20 is not capable of developing the torque required to propel the vehicle, motor 21 may be speeded up so that the torque delivered to the wheels 16 may be sufficient to propel the vehicle. The speeding up of motor 21 under such conditions will be the equivalent of shifting gears in the present type of motor vehicle from high gear to second gear, or to low gear.

The aforementioned description of operation applies in the case where the vehicle is moving in the forward direction. To reverse the vehicle, the engine speeds are adjusted to equal values as in the case where the vehicle is to be started from rest. The vehicle may be reversed by operating motor 21 at a higher speed than motor 20. When so operating the motor ring gear 44 will turn in the same direction as differential gear 40 thereby reversing the direction in which torque shaft 19 turns and the vehicle is therefore driven in reverse.

In Fig. 3 of the drawings an arrangement is shown whereby motors 20 and 21 may be connected either differentially to torque shaft 19 or accumulatively. By this arrangement the engines may be connected differentially where high starting torques are necessary to start and accelerate the vehicle to running speed. Where heavy load conditions or steep grades are encountered, the motors would be connected accumulatively. When connected accumulatively, the motors operate in parallel and the power developed by each is transmitted through bevel gears 26 and 27 to differential gear 39, the pinions 42 and the ring gear 44 to the torque shaft 19. The system shown in Fig. 3 permits operation of either engine by itself, to propel the vehicle in the forward direction, or operation of both engines connected either accumulatively or differentially to the torque shaft.

As shown in Fig. 3, engine 20 transmits its power from its crank shaft 34 through clutch 24, an intermediate or idling shaft 79, clutch 80, shaft 81 and bevel gears 26 and 27 to differential 23. The crank shaft 28 of engine 21 is connected to a shaft 82 on which is mounted a gear 83. Gear 83 is free to turn on shaft 82, and meshes with a gear 84 secured to shaft 25 so as to rotate or turn therewith.

Gear 83 carries a clutch element 85 similar to clutch element 33 shown in Fig. 1 of the drawings. One end of shaft 82 carries a movable two-working position clutch element 86 which is splined to shaft 82 in the same manner that clutch element 35 of clutch 24 (see Fig. 8) is splined to shaft 25. Clutch element 86 has a friction face 87 arranged to frictionally engage the friction face of clutch element 85. It also has a friction face 88 arranged to have frictional engagement with a clutch element 89 carried by a shaft 90. As shown in Fig. 3 shaft 90 carries bevel gear 29 that meshes with bevel gear 30 mounted on differential shaft 38, the same as shown in Fig. 1.

It will be apparent from Fig. 3, that clutch 86 has two-working positions. When in one position face 87 has frictional engagement with clutch element 85 and when in the other of its working positions work face 88 has frictional engagement with clutch element 89. Clutches 80 and 86 may be operated by clutch shifting mechanisms such as shown in Fig. 8. Since they are shown as similar, these clutch shifting mechanisms and their component parts will be designated by the same reference characters. All of the clutch shifting mechanisms shown in the drawings may be operated either by foot pedals or hand levers so mounted in the vehicle as to be convenient for the operator or driver.

If it is desired to operate motors 20 and 21 differentially; that is, to connect the motors differentially to torque shaft 19, engine 20 may be cranked and started either by hand or by a starter motor such as commonly used with motor vehicles. When engine 20 has been started it may be utilized as a cranking motor for engine 21.

To crank engine 21 in this manner clutch 86 may be actuated or shifted to that position in which clutch face 87 engages clutch element 85. When in this position gear 83 will be locked to shaft 82. By moving clutch 24 into clutching position, engine 20 will turn shaft 79 and gear 84 carried thereby, thereby turning the shaft 82 and the crank shaft 28 of engine 21.

When both engines have been cranked and started clutch 86 may be moved to the position shown in full lines in Fig. 3. The engines should now be adjusted to equal speeds. When they have been adjusted to equal speeds clutches 80 and 86 are operated so that shaft 81 is coupled through clutch 80 to shaft 79, and so that clutch face 88 of clutch 86 engages clutch element 89 mounted on shaft 90. When the engines are operating at the same speeds, the vehicle will not move for the reason set forth in the description of operation of the vehicle shown in Fig. 1. Engines 20 and 21 may now be speeded up simultaneously to a predetermined speed depending upon starting conditions as affected by the load on the vehicle and the condition of the road bed.

When the speeds of the engines have been adjusted to the desired value, the speed of motor 21 is decreased and that of motor 20 increased, if necessary, until the vehicle has been started and accelerated to that operating speed at which motor 20 is capable of driving the vehicle under its own power. When this speed has been reached, motor 21 may be shut off and the clutch 86 moved to the position shown in Fig. 3. When in this position, shaft 90 is locked or held against rotation by a brake 49, such as shown in Fig. 7. If the load on the vehicle or the grade of the highway is such that motor 20 cannot efficiently handle the load, clutch 86 may be moved to that position in which clutch face 87 engages clutch element 85. When so connected motors 20 and 21 are accumulatively coupled to the torque shaft 19. By operating motors 20 and 21 at the proper speeds, the load may be equally distributed between them or in proportion to their horsepower capacity.

With the arrangement shown in Fig. 3, motor 20 may be utilized to propel the vehicle by itself after the vehicle has been started and accelerated to running speed or motor 21 may be utilized to perform this work. Since both motors may be utilized to propel the vehicle in the forward direction while operating alone, it is desirable in the interest of economy that motor 20 be materially larger than motor 21. Both motors are utilized to accelerate and propel the vehicle. After the vehicle has been accelerated to the proper speed, motor 20 may be utilized to propel the vehicle. In this case under proper load conditions motor 20 may be operated at or near full load and at its maximum efficiency.

When the vehicle is lightly loaded, motor 21, if the smaller motor, may be utilized to propel the vehicle. Under such load conditions, motor 21 may be operated at or near its maximum horsepower capacity and, therefore, at its maximum efficiency. It will, therefore, be apparent that the arrangement shown in Fig. 3 is one which may be operated economically.

In case motor 21 only is to be used to propel the vehicle, clutch 24 is shifted to the position shown in Fig. 3, after the vehicle has been accelerated to that speed at which motor 21, when operating alone, is capable of handling the load. If motor 21 is operating alone, clutch 86 is moved to the position in which clutch face 87 engages clutch element 85 and clutch 80 is moved to clutching position. It will, therefore, be apparent that the power from motor 21 is transmitted through shaft 82, clutch 86, gears 83 and 84, clutch 80 and shaft 81 to the differential 23.

In Fig. 5 of the drawings a modified form of differential is illustrated that may be substituted for the differential 23 shown in Figs. 1 and 3. The differential shown in Fig. 5 comprises a cage 95 having an exterior ring gear 96 attached thereto that meshes with a gear 97. In practice gear 97 would be mounted either on shaft 28 in place of bevel gear 29 or on shaft 90 in place of the bevel gear 29 which is mounted thereon as illustrated in Fig. 3.

Cage 95 may, in practice, be rotatably mounted on shaft 25 of Fig. 1 or shaft 81 of Fig. 3 and on the torsion shaft 19 illustrated in both Figs. 1 and 3. The differential shown in Fig. 5 includes also a bevel gear 98 keyed to shaft 25 and a bevel gear 99 keyed to torsion shaft 19. Bevel gears 98 and 99 mesh with pinions 100 rotatably mounted on stub shafts 101 journalled in cage 95. With the arrangement shown in Fig. 5, the motor which would be connected to shaft 25 may be materially larger than the motor which would be connected to shaft 28.

It will be apparent by inspection of Fig. 5 that torsion shaft 19 will turn at a speed which is proportional to or a function of the difference between the speed at which bevel gear 98 is driven by shaft 25, and the speed at which cage 95 is driven by pinion 97 and ring gear 96, pinion 97 being driven by shaft 28. It will also be apparent that shafts 25 and 28 which are drive shafts with respect to shaft 19, are differentially connected to shaft 19.

In Fig. 6 of the drawings a still further modified form of differential is illustrated. This differential may be designated as a planetary type of differential and comprises a differential cage 103 having internal and external ring gears 104 and 105 attached thereto. Gears 104 and 105 may be formed as an integral part of the cage or as separate parts so constructed that they may be fixedly secured to the cage. The differential also includes a planetary gear plate 106, pinions 107 that mesh with the internal ring gear 104 and pinions 108 that mesh with a gear 109 keyed to torsion shaft 19. The planetary gear plate may be keyed to shaft 25, in case the arrangement shown in Fig. 1 is employed, or to shaft 81 in case the arrangement shown in Fig. 3 is utilized. As shown, pinions 107 and 108 are mounted on and keyed to stub shafts 110 which are journalled in plate 106.

Ring gear 105 meshes with a pinion 111 which is keyed either to shaft 28, in case the arrangement shown in Fig. 1 is employed, or to shaft 90 if the differential is used in the arrangement shown in Fig. 3. As shafts 25 and 28 are driven, gear 109 will be driven at a speed which is proportional to or a function of the difference between the speeds at which the cage 103 and the planetary gear plate 106 are driven by shafts 28 and 25, respectively. Therefore, it follows that torsion shaft 19 will be driven at the same speed as gear 109.

The principle of operation of the differentials shown in Figs. 5 and 6 is the same as that set forth in the description of the differential 23. Since the operation of differential 23 has been fully set forth, it is believed that further detailed description as to the operation of the differentials shown in Figs. 5 and 6 is unnecessary.

In Figs. 9 and 10 of the drawings a system of levers is illustrated for operating valves 74, 77 and 78 to control the speed and performance of motors 20 and 21.

Valve 74 which controls the speed and performance of motor 20 is connected to a crank 123 that is operated by a link 124. Link 124 is connected to a crank 125 secured to a rotatable shaft 126. Shaft 126 may be turned by a lever arm 127, the outer end of which is connected by a link 128 to a bell crank 129 which is pivoted at 130. Bell crank 129 is arranged to be operated as a foot pedal by the operator or driver of the vehicle.

Valve 78 associated with motor 21 is connected to a crank 131 which in turn is pivotally connected to a push rod 132. Push rod 132 is yieldingly urged to the right as viewed from Fig. 9 by a spring 133, the tension of which is so adjusted that valve 78 is normally urged towards closed position.

When the engines 20 and 21 are accumulatively connected to the torsion shaft 19 in accordance with the arrangement shown in Fig. 3, valves 74 and 78 are operated contemporaneously: that is, they are opened and closed in unison so that the motors will be synchronized, so to speak. In order that valves 74 and 78 may be operated in unison, a crank 134 is provided. Crank 134 is mounted on shaft 126. A lug or block 135 mounted on push rod 132 is placed in front of the lower end of crank 134 so that as the crank turns in a clockwise direction, push rod 132 will be moved to the left thereby opening valve 78.

To operate valves 74 and 78 in unison, the operator pushes downwardly at 136 on bell crank 129 causing it to turn in a clockwise direction. As the bell crank turns in this direction, shaft 126 is turned in a clockwise direction moving crank 134 and lever 125 in a clockwise direction. As the crank and lever move in this direction, the valves 74 and 78 are opened. While the valves 74 and 78 are being so opened, spring 133 is elongated so that when the operator releases his foot from the bell crank 129, the spring 133 will retract push rod 132. As push rod 132 is retracted, crank 134 is turned in a counter-clockwise direction, turning shaft 126 in the same direction and consequently lever 125 which acts to close valve 74 acting through connecting link 124 and crank 123.

Where motor 21 only is to be utilized as a propelling motor, valve 78 may be operated by a foot pedal 137. Foot pedal 137 acts against a block or lug 138 fastened to push rod 132. As foot pedal 137 is depressed, arm 139 thereof is turned in a clockwise direction moving push rod 132 to the left thereby opening the valve. To close the valve the operator merely releases his foot from the pedal, for, in this case, the spring 133 acts to retract the push rod 132.

If it is desired to operate the vehicle in reverse, valves 74 and 78 are adjusted until motors 20 and 21 are operating at substantially the same speed or at such speeds that torsion shaft 19 stands still. After this speed adjustment has been made, foot pedal 137 is depressed thereby opening valve 78 and increasing the speed of motor 21 to a value higher than that at which motor 20 is operating whereby the differential acts in the manner described hereinbefore to reverse the direction in which the vehicle will be propelled.

When motors 20 and 21 are connected differentially to torsion shaft 19 and are operated to accelerate the vehicle in the forward direction, valves 74 and 78 are operated in unison by actuating the foot pedal 129, and valve 77 is operated in the reverse direction or opposite direction. That is if valves 74 and 78 are opened, valve 77 is closed whereby as motor 20 increases in speed motor 21 decreases in speed.

Valve 77 is connected to a lever 140 which in turn is connected to a push rod 141. Push rod 141 carries a lug 142 that forms a bearing for a lever 143 secured to shaft 126. Shaft 141 also carries a lug 144 that forms a bearing for lever 145 mounted on a stub shaft 146. The upper end of lever 145 is connected by a link 147 to mechanism 36 that operates clutch 86 (see Fig. 3). When motors 20 and 21 are accumulatively connected to torsion shaft 19, in accordance with the arrangement shown in Fig. 3, clutch 86 engages clutch element 85. When the clutch is in this position connecting link 147 is pulled to the right as viewed from Fig. 9 and lever 145 is actuated to the position shown in Fig. 9 in which position push rod 141 is held in such a position that valve 77 is wide open. Valves 74 and 78 may, therefore, be operated in unison by foot pedal 129 as aforesaid to obtain synchronous operation of the motors.

To operate motors 20 and 21 in the manner intended when they are connected differentially to torsion shaft 19, clutch 86 is actuated into engagement with clutch element 89. When in this position lever 145 is turned in a counter-clockwise direction by rod 147 that interconnects this lever with the clutch operating mechanism of clutch 86 and causes block or lug 142 to abut against the free end of lever 143.

In order to increase the speed of motor 20 and to decrease the speed of motor 21 or vice versa foot pedal 129 is actuated by depressing it in the manner aforesaid whereby valve 74 is opened. As aforesaid, shaft 126 turns in a clockwise direction when valve 74 is being opened; therefore, since the shaft is turning in this direction, lever 143 is also turning in a clockwise direction and moving away from block 142. As lever 143 is moving away from block 142 push rod 141 is moved to the right by a spring 148. Therefore, it will be apparent that as valve 74 is opened, valve 77 is being closed by spring 148 as lever 143 is turned in a clockwise direction. To increase the speed of motor 21 above that of motor 20, the reverse operation of the lever system takes place, that is the operator releases his foot from foot pedal 129. As he releases the foot pedal spring 133 pulls push rod 132 to the right which acts upon lever 134 turning it in a counter-clockwise direction. Since lever 134 is fastened to shaft 126 lever 143 will turn in a counter-clockwise direction moving connecting link or push rod 141 to the left thereby opening valve 77.

Valves 74, 77 and 78 may also be controlled from the steering wheel of the vehicle by an arrangement such as shown in Fig. 10. This arrangement would be utilized where the motors are connected differentially to torsion shaft 19. The apparatus illustrated in Fig. 10 comprises a shaft 150 mounted within a steering post or column 151. The upper end of shaft 150 is connected to a hand lever 152 which may move from neutral to forward position or from neutral to reverse position. By moving hand lever 152 to the left towards reverse position where the vehicle is caused to move in the reverse direction and when towards forward position the vehicle is accelerated in the forward direction. If hand lever 152 is moved to neutral position the vehicle will come to rest.

The lower end of shaft 150 carries a bevel gear 152 that meshes with a bevel gear 153 mounted on a shaft 154. A crank 155 is secured to shaft 154 and is connected at its outer end to a link 156. Link 156 in turn is connected to a crank 157 that is secured to a shaft 158. A lever 159 is mounted medially of its ends on shaft 158 and is utilized to operate links 160 and 161 respectively.

Connecting rod 160 has a lost motion connection at 162 with lever 159 and is pivotally connected at its upper end to foot pedal 137. An adjustment nut 163 is provided at the lower end of link 160 so that the relative positions of lever 159 and foot pedal 137 may be determined according to operating requirements.

Link 161 has a lost motion connection at its lower end with lever 159 and is pivotally connected to an arm 165 secured to shaft 126. The lower end of link 161 carries an adjustment nut 164 whereby the relative positions of shaft 126 which carry the valve operating levers and arms, and lever 159 may be adjusted to suit operating requirements. With the adjustment shown in Fig. 9, valves 74 and 78 are in their closed positions when lever 159 occupies a horizontal position.

If it is desired to operate the vehicle in a forward direction under hand control, the operator moves lever 152 towards "forward" position. When the lever is moved in this direction, connecting rod 156 is moved in the direction of the arrow 167 whereby lever 159 is turned in a counter-clockwise direction. When moving in this direction link 161 is pulled downwardly turning shaft 126 in a clockwise direction whereby valve 74 is opened to increase the speed of motor 20 above that speed at which motor 21 is operating. The vehicle will then move forward in the manner previously described herein. When lever 159 turns in a counter-clockwise direction, the right hand end thereof moves upwardly on rod or link 160 so that the position of valve 78 which controls motor 21 is not disturbed.

To operate the vehicle in the reverse direction under hand control, hand lever 152 is moved towards "reverse" position. When moved in this direction rod 156 is moved in the direction of arrow 170 whereby lever 159 is turned in a clockwise direction. When turning in this direction the left hand end of this lever moves upwardly on rod 161 so that the position of valve 74 is not disturbed or changed. However, link or rod 160 is pulled downwardly thereby depressing foot pedal 137 whereby valve 78 is opened to increase the speed of motor 21 with respect to the speed at which motor 20 is operating. The vehicle will then move in the reverse direction in the manner previously described herein.

From the above it will be apparent that when both motors are operating differentially, the speed and direction in which the vehicle is propelled may be controlled from the steering wheel by merely moving hand lever 152 towards reverse or forward position as the case may be. The vehicle may be brought to rest, by shifting lever 152 to neutral position in which position the speed of the motors are adjusted to equal values or to such values that the differential gears driven by these motors will be driven in opposite directions at the same speeds.

If engine 21 is materially smaller in horsepower capacity than engine 20, it will be apparent to those skilled in the art that engine 21 may be connected through reduction gearing to differential shaft 28 in case the differential shown in Fig. 4 is employed or to ring gear 96 or 105 in case the differentials shown in Figs. 5 and 6 are employed. If such is the case it will be apparent that engine 21 must operate at a much higher speed than engine 20 in order that the relative speeds of the driven differential gears will be such that the torque shaft 19 will be stationary. If engine 21 is connected by reduction gearing, such as referred to above, it will be apparent that when this engine is slowed down the compression of the engine will be more effective to reduce the speed of the differential element driven by this engine. Hence, the torque delivered by torsion shaft 19 may be caused to vary in gradual incremental steps from a maximum value to that value which obtains when engine 20 is operating alone or when engine 21 is running at idling speed.

While various modifications and changes may be made in the automotive system herein shown and described without departing from the spirit and the scope of the invention, it is to be understood that only such limitations shall be placed on the invention as are imposed by the prior art and the appended claims.

What I claim as new and desire to secure by Letters Patent is:

1. In combination, two gears, a driven element having pinions common to and mating with said gears, whereby the speed of rotation of said driven element is a function of the difference in speed of rotation of said gears, a separate power unit for driving each gear, means for adjusting the speed of said power units to such values that said gears are driven in opposite directions at the same speed whereby the speed of said driven element is zero and means for varying the speed of one of said power units, thereby to drive said driven element at a speed which is a function of the difference in the speed of rotation of said gears, and means for coupling said power units differentially and accumulatively.

2. In combination, two gears, a driven element having pinions common to and mating with said gears, whereby the speed of rotation of said driven element is a function of the difference in speed of rotation of said gears, a separate power unit for driving each gear, means for simultaneously operating said power units at different speeds, means for connecting both of said power units in driving relation with one of said gears, and means for locking the other gear against rotation when said units are both driving the same gear, and means for coupling said power units differentially and accumulatively.

3. In a motor driven vehicle having at least two wheels driven by a torque shaft operating through a differential coupled to said wheels, two power units, means coupling said power units to the torque shaft differentially, and means for at times accumulatively coupling said power units to the torque shaft.

4. In a motor driven vehicle having at least two wheels driven by a torque shaft operating through a differential coupled to said wheels, two power units, means coupling said power units to the torque shaft differentially, and means operating upon said coupling means adapted to transmit the power of said units to the torque shaft accumulatively.

5. In a motor driven vehicle having at least two wheels driven by a torque shaft operating through a differential coupled to said wheels, two power units, means coupling said power units to the torque shaft differentially, gears disposed between said motors and said differential means in driving relation with each other, and clutch mechanisms arranged to act on said gears in such manner that both engines operate accumulatively through said differential means to drive said torsion shaft.

6. In a motor vehicle having at least two wheels arranged to impart tractive effort to the roadway, said wheels being mechanically coupled through a differential, a plurality of power units carried by said vehicle, means connecting said power units to the torque shaft and arranged to drive said shaft at a speed that is proportional to the difference in the speeds at which said power units operating alone will drive said shaft and means for at times transmitting the power from said units accumulatively to the torque shaft.

7. In a motor vehicle having at least two wheels arranged to impart tractive effort to the roadway, said wheels being mechanically coupled through a differential, a torque shaft coupled to said differential, a plurality of power units carried by said vehicle, means connecting said power units to the torque shaft and arranged to drive said shaft at a speed that is proportional to the difference in the speeds at which said power units operating alone would drive said shaft, and means for at times transmitting the power from said units accumulatively through said connecting means to the torque shaft.

8. In combination, two separate independently operable power units, a drive shaft connected to one of said units, a gear rotatably mounted on said shaft, a clutch element rotatably mounted on said drive shaft and secured to said gear, a driven clutch element slidably mounted on said drive shaft, a driven shaft having a clutch element attached thereto, and a brake arranged to permit turning of said driven shaft when driven by its associated power unit and to hold the shaft from turning when said shaft is not driven thereby, said driven clutch element being arranged to frictionally engage either the rotatably mounted clutch element, or the driven shaft clutch element, a differential shaft geared to said driven shaft and having a differential gear thereon, a driven clutch element connected to the shaft of the other power unit, an idler shaft having a clutch element movably mounted thereon and arranged to frictionally engage said driven clutch element, a gear fixed on said idler shaft and meshing with said first mentioned drive shaft gear, a clutch element secured to said second named gear, a driven shaft having a clutch element slidably mounted thereon, said clutch element, when frictionally engaging said second named gear clutch element being arranged to drive said driven shaft, a brake operable upon said second named driven shaft to permit rotation thereof when the engine driving it is operating and to prevent rotation thereof when the engine is inoperative, a second differential shaft geared to said second named driven shaft, a differential gear mounted on said second named differential shaft, a rotatable differential cage having pinions rotatably mounted thereon and meshing with said differential gears, a ring gear carried by said housing, a torsion shaft having a pinion thereon meshing with said ring gear, and means for operating said power units at different variable speeds whereby said torsion shaft is caused to turn at a speed which is a function of the difference in speeds of said power units, said clutches when actuated to certain positions causing said power units to operate differentially upon said torsion shaft, and when one of said clutches is actuated to another position, the said power units operate accumulatively to drive said torision shaft.

9. In combination, two internal combustion engines each having a fuel line for the admission of a combustile mixture to the cylinders thereof, a clutch associated with one of said engines, said clutch having two working positions, a valve in the fuel line of the engine having the two working position clutch, a link connected to said valve, means yieldingly urging said link to a position to close the valve, a lever connection between said two working position clutch arranged to hold said valve open when said clutch is in one of its working positions, a valve in the other of said fuel lines, a link connected to said valve to open and close the same, and a system of levers arranged to operate both of said valve actuating links to thereby operate said valves simultaneously when said clutch is in another of its working positions, one of said valves operating to increase the speed of one engine, and the other valve operating to decrease the speed of the other engine.

10. In a motor driven vehicle having wheels driven by a torque shaft, the combination of a plurality of driving units and means for coupling said driving units to said torque shaft differentially and accumulatively.

11. In a motor driven vehicle having wheels driven by a torque shaft, the combination of a plurality of driving units coupled to the torque shaft differentially, and means for accumulatively coupling said units to the torque shaft.

12. In a motor driven vehicle having wheels driven by a torque shaft, the combination of driving units, means for coupling said units to the torque shaft differentially, and means co-operating with said first-mentioned means for coupling said units to the torque shaft accumulatively.

13. In a motor driven vehicle having wheels driven by a torque shaft, the combination of driving units for said shaft, said units being normally differentially coupled to said torque shaft, and means for accumulatively coupling said units to said torque shaft, said means including a two-way clutch device.

14. In a motor driven vehicle having wheels arranged for imparting tractive effort, said wheels being mechanically coupled to a torque shaft, the combination of a plurality of power units differentially connected to said torque shaft, a fuel line for each of said power units, a butterfly valve positioned in the fuel line of each of said units, an additional valve positioned in the line of one of said units spaced from the first mentioned valve positioned therein, and a lever mechanism for normally operating the two valves positioned in one of said lines in opposition to each other, and additional lever mechanism co-operating with said first mentioned lever mechanism for simultaneously operating the valve in the other fuel line in the same direction as one of the valves in said second fuel line, so that the relative speeds of the power units may be varied simultaneously or independently.

15. In a motor driven vehicle having wheels arranged for imparting tractive effort, said wheels being mechanically coupled to a torque shaft, the combination of a plurality of driving units, said units being differentially coupled to said torque shaft, one of said units including a shaft having a suitable gear mounted thereon, another of said units including a two-part shaft having driving and driven members, the driving member of said two-part shaft having gear means for co-operating with said first mentioned gear so that said units may be driven accumulatively thereby, the driving member of said two-part shaft having a two-movement clutch member slidably splined thereto, the driven member of said two-part shaft having a clutch face rigidly secured thereto for co-operating with said two-way clutch member, so that said power units may drive said torque shaft differentially when said clutch member is in engagement with the clutch face of said driven shaft.

16. In a motor driven vehicle having wheels arranged for imparting tractive effort, said wheels being coupled through a torque shaft, the combination of a plurality of power units differentially coupled to said torque shaft, each of said units having a shaft, the shaft of one of said units having a gear mounted thereon, the shaft of another of said units having a two-part construction of driving and driven members, said driving member having a gear loosely positioned near the end thereof and co-operating with said first mentioned gear, a two-way clutch member slidably splined to the extending end of the driving member of said two-part shaft, a clutch face rigidly secured to said loosely mounted gear and to the end of the driven member of said two-way shaft, said two-way clutch being disposed for non-co-operating at one time with the clutch face of said loosely mounted gear and the clutch face of said driven shaft, and being disposed for at another time co-operating with the clutch element of said loosely mounted gear and coupling said gear to the driving member of said two-part shaft and driving said torque shaft accumulatively, said two-way clutch being disposed for at another time co-operating with a clutch element of said driven member and connecting said driven member to said driving member and driving said torque shaft differentially.

17. In a motor driven vehicle having wheels arranged for imparting tractive effort, said wheels being coupled to a torsion shaft, the combination of a plurality of driving mechanisms differentially connected to said torsion shaft, means inter-connecting said driving units with each other and with said torsion shaft in different relations for at one time accumulatively connecting said driving units to said torsion shaft, for at another time differentially connecting said units thereto, and for at a still further time connecting either one of said units to said torsion shaft and at the same time disconnecting the other of said units.

18. In a motor driven vehicle having wheels driven by a torsion shaft, the combination of a plurality of driving units, means for at a given time coupling said driving units to the torsion shaft differentially, means for at another time connecting said units accumulatively to said torsion shaft, all said above mentioned means co-operating with additional means for at other times independently connecting either of said driving units to said torsion shaft and for at the same time disconnecting the other of said driving units.

19. In a motor driven vehicle having wheels arranged for imparting tractive effort, a differential, said wheels being mechanically connected to said differential, the combination of a plurality of driving mechanisms connected to said differential, one of said driving mechanisms being connected to said differential through a plurality of clutch or coupling mechanisms, another of said units being connected to said differential through a two-way clutch or coupling mechanism, said driving units having gear means co-operating with said two-way clutch for at times connecting them together, and means for shifting the said coupling mechanisms and changing said driving units from an accumulative to a differential connection, and for disconnecting either one of the driving units and connecting the other unit to said differential.

20. In a motor driven vehicle having wheels arranged for imparting tractive effort, said wheels being mechanically coupled through a torsion shaft, the combination of a plurality of power units connected differentially to said torsion shaft, one of said units having a two-part shaft consisting of driving and driven members, another of said units having a three-part shaft consisting of driving, idling and driven members, the driving member of said two-part shaft having a gear loosely positioned thereon near the end thereof, a two-way clutch member slidably splined to the extending end of the driving member of the two-part shaft, clutch faces secured to said loosely positioned gear member and to the extending end of the driven member of said two-part shaft, so that said clutch member can be moved into and out of co-operative relationship therewith, the driving element of said three-way shaft having a clutch face secured to the end thereof, the idling member of said three-part shaft having a slidable clutch member splined to the end thereof adjacent said clutch face, for at times co-operating therewith and driving said idling member, a gear having a clutch face secured thereto securely mounted on the other end of said idling member, the driven member of said three-part shaft having a slidable clutch element splined to the end thereof adjacent the fixed clutch face of the idling member for at times co-operating therewith, said loosely mounted gear of said two-part shaft being disposed for co-operating with the gear member mounted on said idling member of the three-part shaft, said clutch mechanisms being operative for at one time connecting said power units accumulatively to said torsion shaft and at another time connecting said power units differentially to said torsion shaft and for at another time permitting the separate utilization of the driving power of each of said power units.

In testimony whereof, I have hereunto subscribed my name this 26th day of February, 1931.

HUBERT P. SMITH.